Nov. 12, 1935.　　　　　F. W. TEMPLE　　　　　2,020,591
GENERATOR
Filed March 27, 1933　　　3 Sheets-Sheet 1

Inventor:
Fred W. Temple,
By Dyrenforth, Lee, Chritton & Wiles
Attorneys

Nov. 12, 1935.  F. W. TEMPLE  2,020,591
GENERATOR
Filed March 27, 1933  3 Sheets-Sheet 2
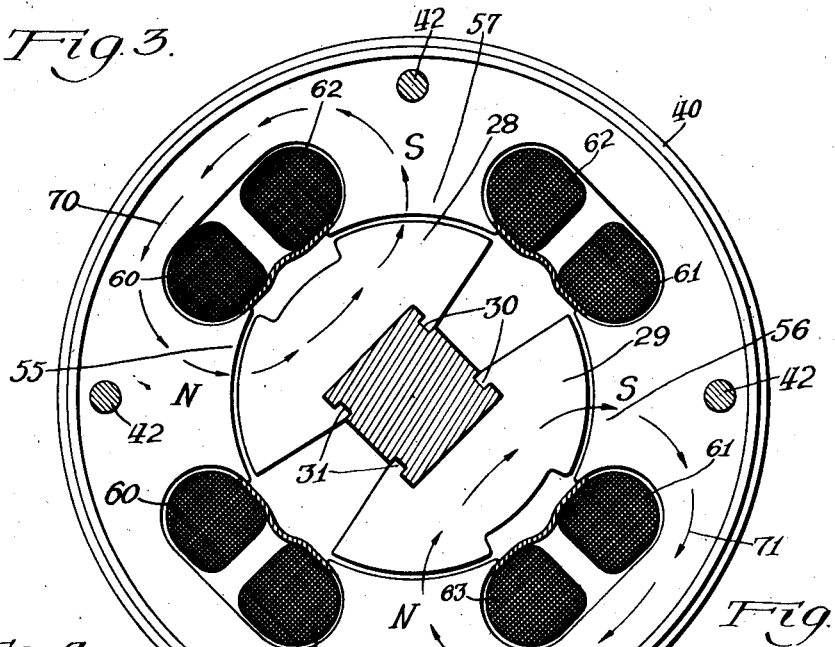
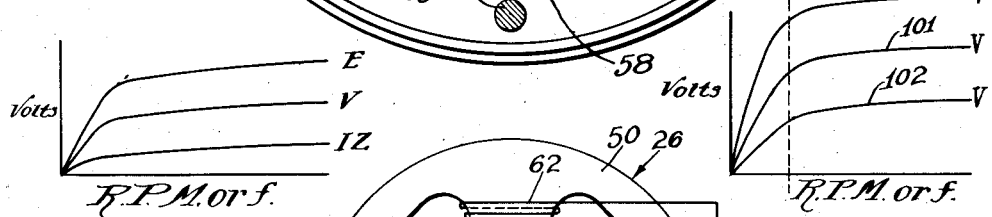
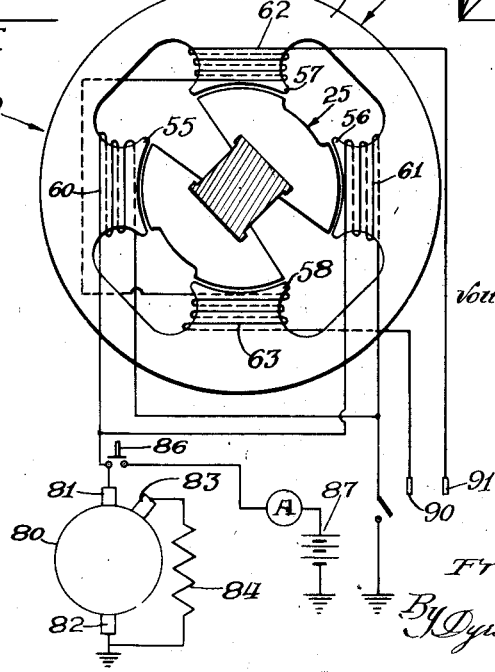
Inventor:
Fred W. Temple.
By Dyrenforth, Lee, Chritten & Wiles
Attorneys Nov. 12, 1935.  F. W. TEMPLE  2,020,591
GENERATOR
Filed March 27, 1933   3 Sheets-Sheet 3
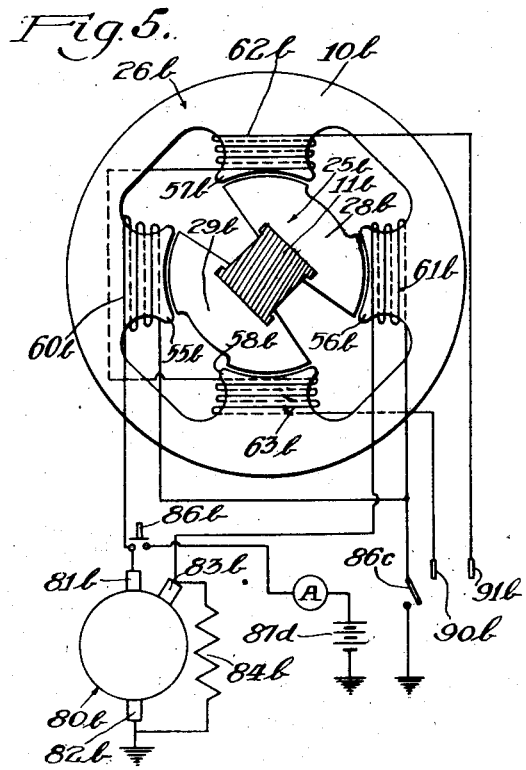
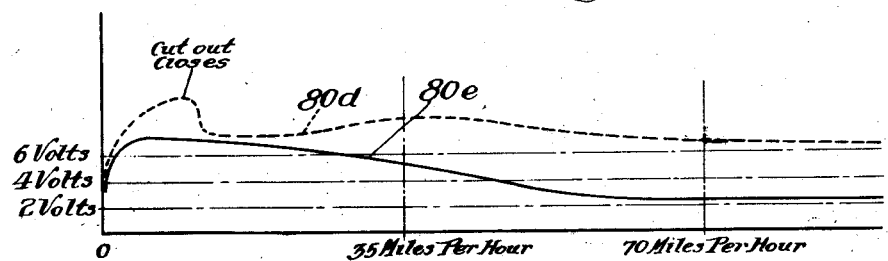
Inventor:
Fred W. Temple,
By Dyrenforth, Lee, Chritton & Wiles
Attorneys Patented Nov. 12, 1935

2,020,591

UNITED STATES PATENT OFFICE 2,020,591

GENERATOR

Fred W. Temple, La Crosse, Wis.

Application March 27, 1933, Serial No. 663,050

5 Claims. (Cl. 171—313)

The invention relates to generators and has among its other objects the provision of improved alternating current generators which are compact, durable, efficient and satisfactory for use wherever found applicable.

A particular object of the invention is to provide an improved alternating current generator which inherently is adapted to regulate the terminal voltage for varying loads or to provide a constant terminal voltage at varying speeds with a constant load.

Another particular object of the invention is to provide improved means for regulating the terminal voltage of an alternating current generator.

Another particular object of the invention is to provide improved means for regulating the terminal voltage of an alternating current generator so that the terminal voltage will remain substantially constant at varying speeds with a variable load.

Still another particular object of the invention is to provide alternating current generators having the characteristics described above and provided with means for rectifying the current.

Other objects and advantages will become apparent as the following detailed description progresses, reference being had to the accompanying drawings, wherein—

Fig. 3 is a section taken on line 3—3 of Fig. 2.

Fig. 4 is a circuit diagram for the improved generator illustrated in Figs. 1, 2 and 3.

Fig. 4a is a diagram which illustrates the operation of the improved generator shown in Figs. 1, 2 and 3.

Fig. 4b is another diagram which illustrates the operation of the improved generator shown in Figs. 1, 2 and 3.

Fig. 4c is a diagram which also illustrates the operation of the improved generator shown in Figs. 1 to 3, inclusive.

Fig. 5 is a circuit diagram of an alternating current generator and regulating means embodying another form of the invention, and Fig. 6 is a diagram which illustrates the operation of the apparatus illustrated diagrammatically in Fig. 5.

Figure 1:
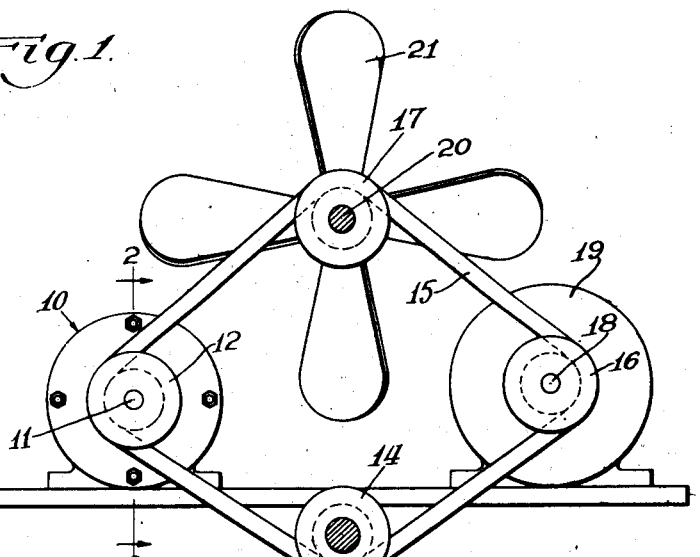
Fig. 1 is a diagrammatic view showing a generator embodying the invention in connection with apparatus for driving it.

Referring for the present to Figs. 1 to 4, inclusive, wherein an alternating current generator embodying the invention is shown, the reference character 10 designates the improved generator generally. The generator 10 comprises a shaft 11 provided with a pulley 12, which, in this instance, is operatively connected to a driving pulley 14 by a belt 15. The belt 15 is also trained over pulleys 16 and 17. The pulley 16 is fixed to the shaft 18 of an electric generator 19. The pulley 17 is fixed to a shaft 20 with which a fan 21 is constrained to rotate. It is contemplated that generators embodying the invention will be utilized on automobiles, or the equivalent, to provide electric current for operating radio receivers or for supplying current to the lamps usually provided in such vehicles or to additional lamps mounted on the vehicle. It is also contemplated that generators embodying my invention may be employed in place of the generators now provided upon automobiles, or the like. Fig. 1 illustrates diagrammatically the manner in which my improved generator 10 may be driven by the fan belt 15 of an automobile. The pulley 14 is adapted to drive the belt 15 and it may be driven from any suitable shaft of the automobile. The fan 21 is the fan usually provided in connection with the cooling system of an automobile. The generator 19 is a generator of the type now commonly provided in automobiles for providing electric current for its operation.

Figure 2:
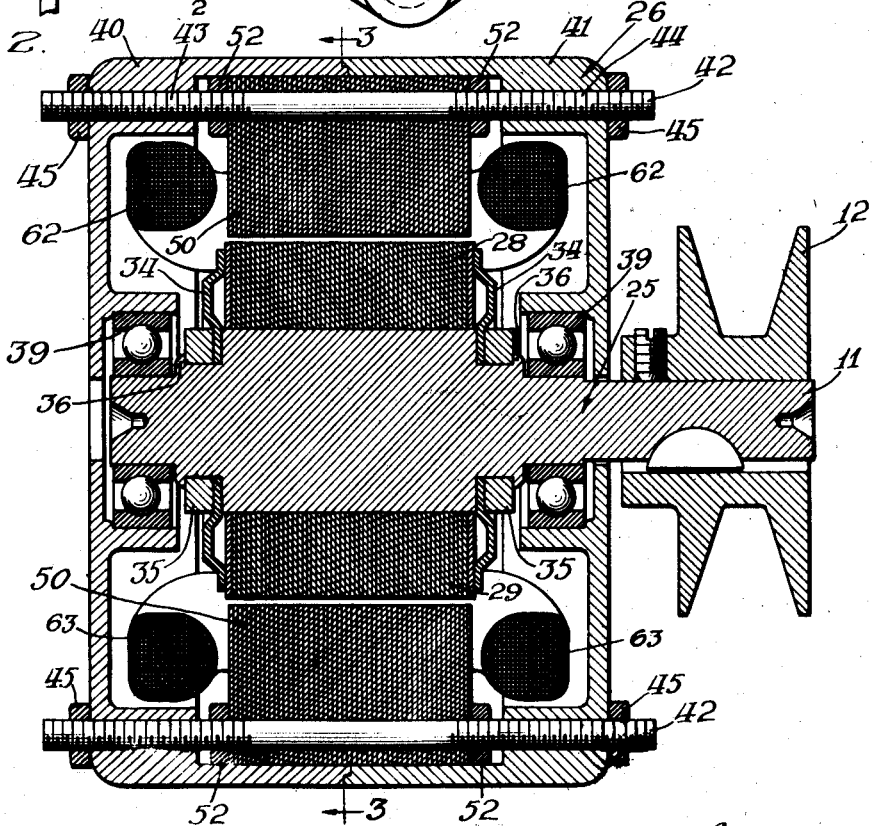
Fig. 2 is an enlarged section taken on line 2—2 of Fig. 1.

Referring now more particularly to Figs. 2 and 3, it will be noted that the generator 10 comprises a rotor 25 and a stator 26. The rotor 25 comprises the shaft 11 and laminated segments 28 and 29 disposed diametrically upon the shaft 11. The portion of the shaft 11 on which the laminated segments 28 and 29 are mounted is preferably square in cross-section as illustrated in Fig. 3. The squared portion of the shaft 11 is preferably provided with grooves 30 which are engageable by integral lugs 31 formed upon the laminations of the segments 28 and 29. These laminations are secured against longitudinal displacement on the shaft 11 by plates or washers 34 mounted on the shaft and secured thereto by collars 35, the collars 35 being held against displacement by flanges 36 riveted over from the shaft onto the collars. The shaft 11 is preferably journaled in ball-bearings 39 mounted in the stator 26.

The stator 26 comprises cup-shaped housing members 40 and 41 which are secured to each other by means comprising screw-threaded rods 42 projecting through bores 43 and 44, respectively, provided in the housing members 40 and 41. It will be noted that nuts 45 screw-threaded upon the rods 42 co-operate with the rods to secure the housing members 40 and 41 to each other. Disposed within the housing members 40 and 41 are annular laminations 50 which preferably constitute the stator proper. The laminations 50 are apertured to receive the rods 42 and nuts 52 screw-threaded upon the rods 42 clamp the laminations 50 in place within the housing members 40 and 41. In this instance, the laminations 50 are shaped to provide poles 55, 56, 57 and 58, the poles 55 and 56 being disposed in opposite relation and the poles 57 and 58 being disposed in opposite relation. The poles 55 and 56 are provided with windings 60 and 61, respectively, and the poles 57 and 58 are provided with windings 62 and 63, respectively. As hereinafter described, the windings 60 and 61 are connected operatively to a suitable source of direct current and the windings 62 and 63 are connected to the load.

If it is assumed that the windings 60 and 61 are connected to the source of direct current in such manner that the poles 55 and 56 are north and south poles, respectively, and if it is assumed that the rotor 25 is in the position illustrated in Fig. 3 at some instant during its operation, it will be readily understood that magnetic flux will flow through the poles 55 and 57 and the laminated segment 28 in the direction indicated by the arrows 70 so that the pole 57 will be a so-called south pole at that instant. Simultaneously, magnetic flux will flow through the poles 56 and 58 and the laminated segment 29 in the direction indicated by the arrows 71 so that the pole 58 will be a north pole at that instant. Now, if it is assumed that the rotor 25 is displaced angularly in a clockwise direction (Fig. 3) there will be a reversal in the direction of the flux flowing through the poles 57 and 58. Such reversal of the flux will take place during every angle of 90° during the rotation of the rotor. Obviously, an alternating current will be induced in the windings 62 and 63 which alternating current will have a frequency determined by the speed of rotation of the rotor 25.

Referring now to Fig. 4 wherein a preferred circuit diagram for the generator 10 is shown, it will be noted that the generator 10 is operatively connected to a direct current generator 80 which is provided with main brushes 81 and 82 and a third brush 83, the third brush 83 being associated with one end of a shunt field winding 84. The brush 82 is connected to the other terminal of the field winding 84 and to ground. The brush 81 is connected to one terminal of the winding 60 and to one terminal of the winding 61, the other terminals of these windings being connected to ground so that the windings 60 and 61 are connected in parallel. The brush 81 is connected through a cutout switch 86 with one terminal of a storage battery 87 which has its other terminal grounded, the storage battery 87 being the storage battery usually provided in the automobile. The windings 62 and 63 are connected in series and are connected in terminals 90 and 91 which may be inserted in a suitable plug in a radio receiver, the generator 10 being particularly adapted, in this instance, to form the power supply for an alternating current radio receiver.

The cutout switch is open when the generator 80 is not in operation and also when the terminal voltage of the generator is not sufficiently high to enable it to charge the battery 87. It will be noted that the cutout switch also prevents the battery 87 from discharging through the windings 60 and 61 when the generator 80 is not in operation.

In practice, the generator 80 has a terminal voltage of from 6 to 7 V. during operation. The windings 60 and 61 are energized continuously by the current of the generator 80 when the apparatus is in operation. The rotation of the rotor 25 causes the generator 10 to deliver an alternating current which, in pactice, is ordinarily of the order of 110 V. when the apparatus is employed in connection with a radio receiver of the type now commonly employed in connection with standard central station alternating current circuits. However, it will be readily understood that the windings on the stator 26 may be proportioned in such manner that a voltage of any desired magnitude may be obtained at the terminals 90 and 91. Thus, the generator 10 may be constructed to deliver a 6 V. alternating current adapted to be employed to energize the lamps usually provided upon motor vehicles.

The rule for determining the terminal voltage of a generator embodying the invention is expressed in the following formula:

$$V = E' - IZ$$

where V represents the terminal voltage, E' represents the induced voltage in the windings 62 and 63 (the armature coils) and Z is the synchronous impedance. I, of course, is the current.

It will be readily understood that E', the induced voltage, varies, but not in a constant ratio, with the frequency $f$. The synchronous impedance Z also varies, but not in a constant ratio, with $f$.

Fig. 4a illustrates graphically in a general manner the increase in the values of E', V and IZ with an increase in frequency.

It will be noted from an inspection of Fig. 4a that the values E', V and IZ tend to become substantially constant in value as a frequency increases. This is due mainly to armature reaction in the case of E' and armature reactance in the case of value IZ. It will be noted that the value V is equal to the value E' minus the value IZ, in accordance with the formula given above.

Referring now to Fig. 4b, the graphs Va and Vb indicate the values V for two generators which embody my invention and are subjected to identical loads. The graph Vb represents the value V of a generator having a predetermined inductance, in the armature windings 62 and 63. The graph Va represents the value of a generator having a lower inductance in the armature windings 62 and 63. It will be noted that the higher the inductance of the armature windings the sooner the value V will attain, approximately, its constant value. This point is of particular importance as it will be readily understood that when a generator embodying the invention is employed upon an automobile, it may be designed so that it will give, approximately, its maximum voltage at idling speeds.

Fig. 4c illustrates three graphs or curves 100, 101 and 102 which illustrate the values V for a generator which embodies the invention and is subjected to three different loads. The graph 102 indicates the value V when the generator is subjected to the highest load, the graph 100 indicates the value V when the generator is subjected to the smallest load of the three and the graph 101 represents the value V when the generator is subjected to the intermediate load. It will be noted that in each instance, the value V assumes, at substantially the same frequency, a value approximately equaling its maximum value. In other words, the knees of the three curves occur at substantially the same frequencies.

One advantage of the above construction will become apparent from the following example: Assuming that one constructed a generator which embodies the invention and had an output of two amperes at a voltage of 110 at all speeds above the critical speed illustrated by the dotted line 105 passing through the knees of the graphs or curves 100, 101 and 102, it will be readily understood that if the necessary load is only one ampere in a certain installation, the voltage may be maintained at a desired constant value by adding additional load to the original load of one ampere.

In the preferred embodiments of the invention, the generators are characterized by the following features: First, the rotors are not provided with windings, second, the rotor of each machine comprises a plurality of segments of magnetic material spaced from each other by non-magnetic material, third, the ease with which voltage regulation at varying speeds is obtained by the inherent characteristics of the machines, and fourth, the complete reversal of the magnetic flux in the armature windings 62 and 63 as distinguished from the practice of varying the magnetic flux by varying the reluctance of the magnetic path.

From the foregoing it is evident that generators embodying the invention are particularly adapted to provide the power supply for radio receivers in automobiles and also for the lamps on the automobile. It is contemplated that on large trucks or trailers, generators embodying the invention will be utilized in addition to the usual generators to provide current for additional lamps. The generators, which embody the invention, will be driven preferably by the fan belt, or the equivalent. It is also contemplated that generators embodying the invention may be utilized in place of the generators now provided in automobiles to provide the ignition current, the current for charging the usual storage battery and the current for operating the lamps.

Referring now to Fig. 5 wherein apparatus embodying another form of the invention is shown, the reference character 10b designates a generator which is substantially identical in construction with the generator 10 described above. The generator 10b comprises a shaft 11b which carries laminated segments 28b and 29b formed from magnetic material. The shaft 11b is formed from non-magnetic material. The shaft 11b and the laminated segments 28b and 29b form a rotor 25b. The stator is designated at 26b and is preferably formed from laminated magnetic material. The stator 26b comprises poles 55b, 56b, 57b and 58b. The poles 55b and 56b are provided with windings 60b and 61b, respectively, the poles 57b and 58b being provided with windings 62b and 63b, respectively. The generator 10b is adapted to be utilized upon an automobile in the same manner as the generator 10 described above and may be driven by a fan belt of the automobile. The generator shown at 80b is a generator of the type usually provided in automobiles to supply current to the lamps, the storage battery and the ignition system. The generator 80b is provided with main brushes 81b and 82b whereby direct current is delivered by the generator 80b to the apparatus operatively connected to it. The generator 80b also comprises a third brush 83b whereby regulation of the voltage is obtained. This construction is well known in the art. The brush 83b is connected through a field winding 84b to the brush 82b and to ground. The storage battery of the automobile is indicated at 87d. A cutout switch is shown at 86b and the reference characters 90b and 91b represent terminals adapted to be connected to the terminals of a radio receiver.

The brush 81b is connected to one terminal of the cutout switch 86b and to a terminal of the winding 60b. The other terminal of the switch 86b is connected to a terminal of the battery 87b which has its other terminal grounded. The other terminal of the winding 60b is connected to one terminal of the winding 61b and to a terminal of a switch 86c which has its other terminal grounded. The other terminal of the winding 61b is connected to the brush 63b. The terminal 91b is connected to one terminal of the winding 62b, the other terminal of the winding 62b being connected to a terminal of the winding 63b. The remaining terminal of the winding 63b is connected to the terminal 90b.

The windings 60b and 61b are energized by a direct current supplied by the generator 80b. Thus, when the apparatus shown in Fig. 5 is in operation and the switch 86c is closed, the current flows as follows: From the brush 81b through the winding 60b and thence through the switch 86c to ground. Another current flows from the brush 83b through the winding 61b and thence through the switch 86c to ground. Of course, the voltage across the terminals of the winding 61b is less than that across the terminals of the winding 60b, but as the pickup windings 62b and 63b are in series, this difference in voltages with respect to the windings 60b and 61b does not affect the operation of the apparatus from a practical standpoint. The generator 10b functions substantially in the same manner as the generator 10 described above. The pickup or armature windings 62b and 63b provide an alternating current to a radio receiver (not shown) through the medium of the terminals 90b and 91b. The cutout switch 86b functions in the same manner as the cutout switch 86 described above. It might be mentioned that the windings 60b and 61b will buck each other when the switch 86c is opened.

Fig. 6 illustrates graphically the terminal voltage of the generator 80b and the voltage of the third brush 83b at different speeds. The generator 80b is designed to have a terminal voltage of between 6 and 7 V. when it is in operation upon an automobile. The curve 80d illustrates the terminal voltages at the various speeds of the automobile and it will be noted that the terminal voltage of the generator 80b has an abrupt drop when the cutout switch 86b closes. It will also be noted that the terminal voltage of the generator 80b remains above 6 V. in value throughout substantially the entire operating range of the generator. The voltage of the third brush 83b is indicated by the curve 80e. This voltage is initially above 6 V. when the automobile is operating at the lower speeds but falls to a value slightly above 2 V. when the automobile is operated at the higher speeds. Obviously, the winding 61b will be subjected to a smaller energizing current at the higher speeds of the automobile and there will be a decrease in the magnetic flux created by this winding. This decrease in the magnetic flux in the pole 56b will regulate the voltage across the terminals 90b and 91b so that a substantially constant voltage will be impressed upon the radio receiver (not shown).

I shall now explain the construction of the generator 10 of Figs. 1, 2 and 3 when the generator is to be driven at a constant speed to supply current at a substantially constant voltage to a variable load. Referring to Fig. 4a, it will be noted that if the value Z is made sufficiently small, it will cause the value IZ to be small. In other words, it will take a large variation in the value I to make a large variation in the value IZ. Therefore, if the pickup windings 62 and 63 of the generator 10 have a low inductance, the generator 10 may be driven at a predetermined speed to deliver a current at a substantially constant voltage to a load which varies within relatively wide limits. This form of the invention has been embodied in a machine which has given extremely satisfactory results.

In this specification and in the appended claims the improved generator is defined as a generator of the inductor type. This definition is employed to define a generator in which both field and armature windings are stationary, and in which masses of iron or inductors, by moving past the coils, alternate the magnetic flux through them. Generators of this type may be either single-phase or polyphase.

While I have shown and described certain embodiments of my invention, it is to be understood that it is capable of many modifications. Changes, therefore in the construction and arrangement may be made without departing from the spirit and scope of the invention as disclosed in the appended claims, in which it is my intention to claim all novelty inherent in my invention as broadly as possible, in view of the prior art.

I claim:

1. The combination with a direct current generator having means including a third brush for controlling the voltage thereof, of a generator of the inductor type comprising a stator having a plurality of poles, field and armature windings on said poles, a rotor, means operatively connecting at least one of said field windings with the main terminals of said direct current generator, and means operatively connecting said third brush to at least one of said field windings.

2. The combination with a direct current generator having main brushes and having means including a third brush for controlling the voltage thereof, of a generator of the inductor type comprising a stator having a plurality of poles, field and armature windings on said poles, and a rotor, together with means operatively connecting at least one of said field windings with the main brushes of said direct current generator, and means operatively connecting said third brush to at least one of said field windings whereby a substantially constant terminal voltage is maintained by said inductor type generator for a constant load at variable speeds.

3. The combination with a direct current generator having means including a third brush for controlling the voltage thereof, of a generator of the inductor type comprising field and armature windings, and means operatively connecting at least one of said field windings to said third brush.

4. The combination with a direct current generator having main brushes and having means including a third brush for controlling the voltage thereof, of a generator of the inductor type comprising a stator having a plurality of poles, field and armature windings on said poles, and a rotor, a storage battery connected across two of said brushes of the direct current generator, and said field windings of the inductor type generator being connected to said brushes, whereby the terminal voltage of said inductor type generator is influenced by the load of the battery and the control of the third brush.

5. The combination with a direct current generator having main brushes and having means including a third brush for controlling the voltage thereof, of a generator of the inductor type comprising a stator having a plurality of poles, field and armature windings on said poles, and a rotor, a common drive means for said generators and means connecting said field windings to said brushes whereby to regulate the output voltage of said inductor type generator from said third brush.

FRED W. TEMPLE.